(12) United States Patent
Unton

(10) Patent No.: US 10,060,347 B2
(45) Date of Patent: Aug. 28, 2018

(54) SYSTEMS, METHODS AND APPARATUSES FOR INTERCONNECTION OF ROTATING COMPONENTS

(71) Applicant: Rolls-Royce Corporation, Indianapolis, IN (US)

(72) Inventor: Timothy Unton, Avon, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 454 days.

(21) Appl. No.: 14/752,433

(22) Filed: Jun. 26, 2015

(65) Prior Publication Data

US 2015/0292401 A1 Oct. 15, 2015

Related U.S. Application Data

(63) Continuation of application No. PCT/US2013/078359, filed on Dec. 30, 2013.

(Continued)

(51) Int. Cl.
*F02C 3/107* (2006.01)
*F02C 7/20* (2006.01)
*F04D 29/054* (2006.01)
*F04D 29/26* (2006.01)
*F01D 5/06* (2006.01)
*F01D 5/02* (2006.01)

(52) U.S. Cl.
CPC .............. *F02C 3/107* (2013.01); *F01D 5/026* (2013.01); *F01D 5/06* (2013.01); *F01D 5/066* (2013.01); *F02C 7/20* (2013.01); *F04D 29/054* (2013.01); *F04D 29/266* (2013.01); *F05D 2220/32* (2013.01); *F05D 2230/60* (2013.01); *F05D 2260/30* (2013.01); *F05D 2260/4031* (2013.01)

(58) Field of Classification Search
CPC .......... F02C 3/107; F01D 5/025; F01D 5/026; F01D 5/06; F01D 5/066; F01D 5/063; F04D 29/054; F04D 29/266; F05D 2230/60; F05D 2260/30
See application file for complete search history.

(56) References Cited

U.S. PATENT DOCUMENTS 2,869,820 A * 1/1959 Marchant .................. F01D 5/06
416/201 R
3,070,348 A 12/1962 Vogel
(Continued)

FOREIGN PATENT DOCUMENTS

EP 2415967 A1 2/2012
FR 900312 A 6/1945

OTHER PUBLICATIONS

FR900312 (Daimler-Benz); English Translation via www.worldwide.espacenet.com.*

(Continued)

*Primary Examiner* — Logan Kraft
*Assistant Examiner* — Peter T Hrubiec
(74) *Attorney, Agent, or Firm* — McCracken & Gillen LLC

(57) ABSTRACT

One embodiment is an apparatus comprising a first rotational component including an elongated connecting element fixed thereto and extending axially therefrom through a second rotational component to an end structure. The connecting element is connected to the end structure to compress the second rotational component between the end structure and the first rotational component.

23 Claims, 2 Drawing Sheets

Related U.S. Application Data

(60) Provisional application No. 61/747,725, filed on Dec. 31, 2012.

(56) References Cited

U.S. PATENT DOCUMENTS

| | | |
|---|---|---|
| 6,481,917 B1 | 11/2002 | Chen et al. |
| 2009/0060735 A1* | 3/2009 | Ganesh .................. F01D 5/063 |
| | | 415/220 |
| 2010/0166559 A1 | 7/2010 | Ahaus et al. |

OTHER PUBLICATIONS

International Search Report and Written Opinion in corresponding PCT application (i.e., PCT/US2013/078359), dated Oct. 17, 2014 (11 pages).

Communication pursuant to Article 94(3) EPC for Application No. 13 871 297.1, dated Oct. 26, 2017, Applicant Rolls-Royce Corporation (5 pages).

* cited by examiner

SYSTEMS, METHODS AND APPARATUSES FOR INTERCONNECTION OF ROTATING COMPONENTS

CROSS-REFERENCE TO RELATED APPLICATION

The present application is a continuation of PCT Application No. PCT/US2013/078359, filed Dec. 30, 2013, which claims the benefit of U.S. Provisional Patent Application 61/747,725, filed Dec. 31, 2012, each of which are incorporated herein by reference.

TECHNICAL FIELD

The technical field relates generally to compressors and more particularly to apparatuses, systems, and methods for interconnection of rotating components, such as in a gas turbine engine.

BACKGROUND

Gas turbine engines are an efficient source of energy and have proven useful to propel and power aircraft, for electricity generation, as well as for other uses. One aspect of gas turbine engines is that they include structures, systems, subsystems, parts, pieces, and other components which must be interconnected. Presently, apparatuses, systems and methods of gas turbine engine component interconnection often suffer from a number of disadvantages, limitations, and drawbacks. Examples include those respecting weight, mass, complexity, ease of assembly or disassembly, part count, engine envelope, engine profile, and others. Thus, there is a need for the unique and inventive apparatuses, systems, and methods for interconnection of rotating components, such as in a compressor of a gas turbine engine.

SUMMARY

One embodiment is a unique apparatus for interconnection of rotating components. Other embodiments include unique apparatuses, systems, methods, and combinations of these and/or other aspects relating to gas turbine engines and compressors for gas turbine engines. Further embodiments, forms, objects, features, advantages, aspects, and benefits shall become apparent from the following description and drawings.

DETAILED DESCRIPTION

Figure 1:
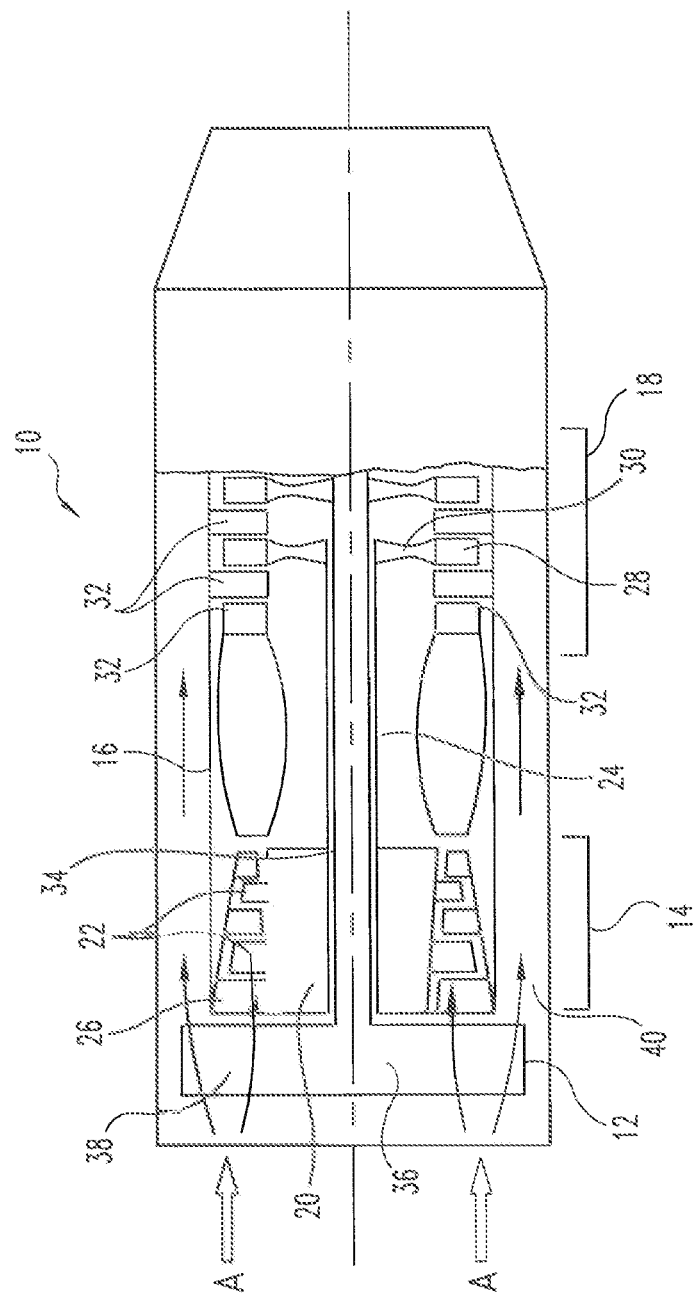
FIG. 1 is a schematic diagram of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a schematic representation of a gas turbine engine 10, which includes a compressor section 14, a combustor section 16, and a turbine section 18 which are integrated together to provide an aircraft flight propulsion engine. This type of gas turbine engine is generally referred to as a turbo-fan. One alternate form of a gas turbine engine includes a compressor section, a combustor section and a turbine section which have been integrated together to produce an aircraft flight propulsion engine without the fan section. As used herein, the term aircraft includes helicopters, airplanes, missiles, spacecraft, unmanned space devices and any other substantially similar devices.

The compressor section 14 includes a plurality of wheels 20 each having a plurality of compressor blades 22 coupled thereto that extend from rims of respective ones of the wheels 20. The wheels 20 are interconnected with one another along their rims and are affixed to a shaft 24 that is rotatable within the gas turbine engine 10. A plurality of compressor vanes 26 are positioned within the compressor section 14 to direct the fluid flow relative to blades 22. Turbine section 18 includes a plurality of turbine blades 28 that are coupled to a rotor disk 30. The rotor disk 30 is affixed to the shaft 24, which is rotatable within the gas turbine engine 10. Energy extracted in the turbine section 18 from the hot gas exiting the combustor section 16 is transmitted through shaft 24 to drive the compressor section 14. Further, a plurality of turbine vanes 32 are positioned within the turbine section 18 to direct the hot gaseous flow stream exiting the combustor section 16.

As illustrated in the turbo-fan embodiment of FIG. 1, the turbine section 18 provides power to a fan shaft 34, which drives the fan section 12. The fan section 12 includes a fan 36 having a plurality of fan blades 38. Air enters the gas turbine engine 10 in the direction of arrows A and passes through the fan section 12 into the compressor section 14 and a bypass duct 40.

It is important to realize that there are multitudes of gas turbine engine configurations and other types of rotating components. For example, additional compressors and turbines could be added with intercoolers connecting between the compressors, reheat combustion chambers could be added between the turbines, and multiple compressor and turbine stages could be present. Furthermore, in addition to aircraft propulsion applications, gas turbine engines can be used for industrial applications, such as pumping sets for gas and oil transmission lines, electricity generation, and naval propulsion, to name a few examples. Apparatuses, systems and methods of component interconnection are applicable to all types of rotating components, including gas turbine engines and are not limited the exemplary embodiments shown and described herein. It should also be appreciated that the exemplary embodiments described herein include a number of rotational engine elements including, for example, shafts, disks, wheels, blades, compressor components, turbine components, gears, and fans, to name a few examples. Various embodiments of gas turbine engine component interconnection may include fewer or greater numbers of components, including as many as a complete gas turbine engine, or as few as two gas turbine engine components.

Figure 2:
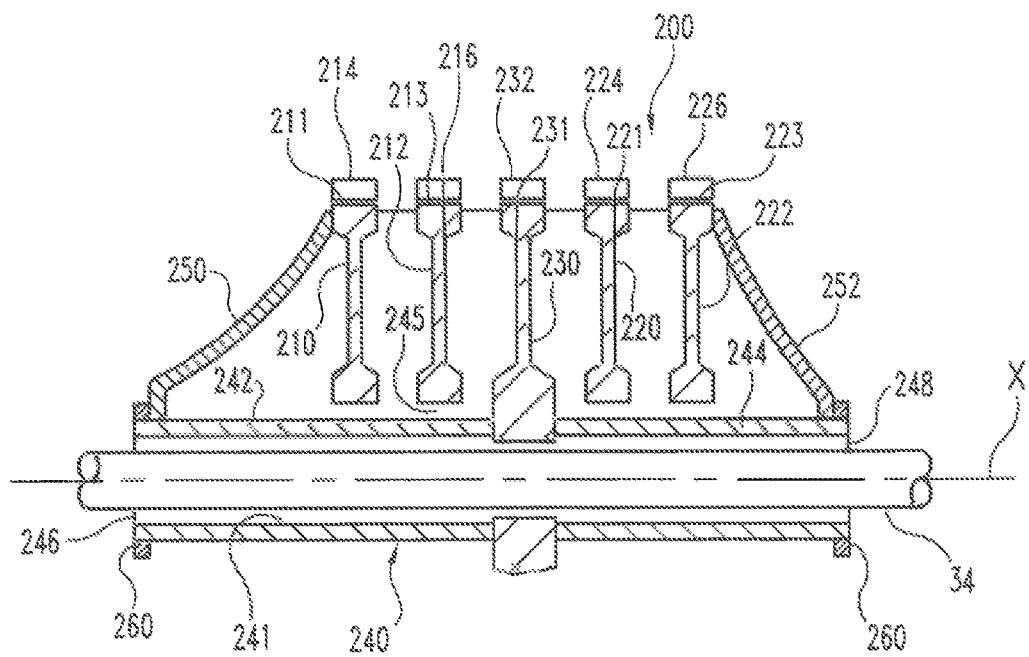
FIG. 2 is an illustrative sectional view of interconnected gas turbine engine components.
Figure 3:
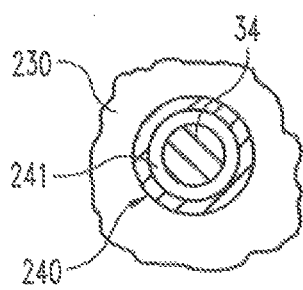
FIG. 3 is an illustrative sectional view of a portion of a compressor wheel component of FIG. 2.

With reference to FIG. 2 there is an illustrative view of interconnected gas turbine engine compressor wheels 200. In the illustrated embodiment, portions of five wheels are illustrated, although it should be understood that more than or fewer than five wheels may be provided. First and second wheels 210, 212 include, respectively, exterior circumferential surfaces 211, 213 with blades 214, 216 extending therefrom, and third and fourth wheels 220, 222 include, respectively, exterior circumferential surfaces 221, 223 with blades 224, 226 extending therefrom. Mounting wheel 230 is positioned between second wheel 212 and third wheel 220 and also includes exterior circumferential surface 231 with blades 232 extending therefrom. Although two wheels are shown on each side of mounting wheel 230 in FIG. 2, mounting wheel 230 may have just one outer wheel on one or both sides thereof, or more than two outer wheels on one or both sides thereof. Furthermore, the number of wheels on the opposite sides of mounting wheel 230 may be the same or different in number. In addition, in another embodiment, mounting wheel 230 may be an end wheel and have one or more wheels on only one side thereof. Blades 214, 216, 224, 226, 232 are illustrated generically and could have a variety of angles, contours, designs, dimensions, geometries, shapes, sizes and other properties as would occur to those skilled in the art. During gas turbine engine operation wheels 210, 212, 220, 222 and 230 rotate about an axis illustrated as dashed line X.

As illustrated in FIG. 2, a connecting element 240 extends from mounting wheel 230 and interconnects 210, 212, 220 and 222 to mounting wheel 230. Connecting element 240 is formed by opposite connecting element portions 242, 244 extending axially from opposite sides of mounting wheel 230 and through an axial bore 245 defining an axial passage defined by each of the wheels 210, 212, 220 and 222. Connecting element 240 is aligned on or substantially on axis of rotation X and includes, in one embodiment, a hollow interior 241 to accommodate one or more shafts or other structures of the gas turbine engine, such as shaft 34. Other embodiments contemplate a solid connecting element 240. As used herein, substantial alignment on longitudinal axis means that connecting element is positioned more adjacent to axis X than to the circumferential surfaces of compressor wheels 210, 212, 220, 222, 230. The outer ends 246, 248 of connecting element portions 242, 244 are removably connected to a mounting structure 250, 252, respectively, located on the outer opposite sides of the outermost first and fourth wheels 210, 222.

Mounting structures 250, 252 are engaged to first and fourth wheels 210, 222 so that as connecting element portions 242, 244 are placed in tension while being engaged to the respective mounting structure 250, 252, the rims of first and fourth wheels 210, 222 are compressed against the rims of second and third wheels 212, 220, which in turn are compressed against the rim of mounting wheel 230. As used herein, a rim includes the facing side surfaces of the compressor wheel adjacent to or connected with its outer circumferential surface at a location spaced from axis X, and/or arms, flanges or other structures projecting outwardly from such side surfaces of the compressor wheel. Mounting structures 250, 252 can be any outer wheel, strut, or any other member or structure that is connected to the outermost wheels and of sufficient strength to transmit the clamping force from connecting element 240 to the wheel assembly. The clamping engagement of the rims rotatably interconnects the wheels to one another for torque transmission through splined interfaces, curvic couplings, friction fits created by a tight fit between component surfaces, or other suitable coupling arrangements at the rims that is sufficient to maintain the interconnection of wheels 210, 212, 220, 222, 230 during engine operation. In addition, in embodiments with connecting element portions 242, 244 extending from opposite sides of mounting wheel 230, different tension forces can be applied to connecting element portions 242, 244 to provide an overall stiffer assembly than could be achieved through a single tension member.

Connecting element 240 can also be uncoupled from the mounting structures 250, 252 to permit decoupling and separation of wheels 210, 212, 220, 222 and 230, for, for example, maintenance, inspection, repair, or replacement of various gas turbine engine components. Any suitable fastener or connection of ends 246, 248 with the respective mounting structure 250, 252 is contemplated. In one embodiment shown in FIG. 4, connecting element 240 is formed as an integral part of mounting wheel 230 to provide a fixed connection as a one-piece component with connecting element portions 242, 244. In other embodiments, such as shown in FIG. 2, connecting element 240 is provided as one or more separate components that are fastened, welded and/or bonded by appropriate means to at least one mounting wheel 230 to provide a fixed connection therewith, and to one or more of the other wheels in further refinements of this embodiment. In either embodiment, connecting element 240 and mounting wheel 230 isolate the portion axial bore 245 defined by first and second compressor wheels 210, 212 around connecting element 240 from the portion of axial bore 245 defined by third and fourth compressor wheels 220, 222 around connecting element 240, providing two distinct zones for the bore 245 that may be beneficial for secondary flow.

In still other embodiments, connecting element portions 242, 244 can be made from different material from each other and/or from the material of mounting wheel 230. This allows the materials for the portions 242, 244 of connecting element 240 to be optimized for the temperatures and loads that will be encountered in the engine based on the location of the connecting element portion 242, 244. With the benefit of the present disclosure, it is anticipated that selection of material types for the compressor wheel and/or connecting element portions 242, 244 is within the capability of one of ordinary skill in the art.

With reference to FIG. 2 there is shown one example of a fastener for securing connecting element 240 to mounting structure 250, 252. Fastener 260 includes a nut threaded around the respective end 246, 248 of connecting element 240 into abutting engagement with the adjacent mounting structure 250, 252. As the nut is tightened against the adjacent mounting structure 250, 252, connecting element 240 is placed in tension and a clamping force is applied to the rims of the wheels through the mounting structures.

Figure 4:
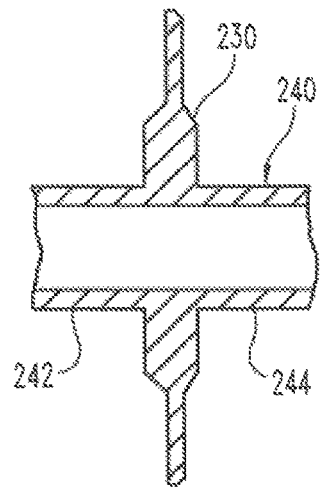
FIG. 4 is an illustrative sectional view of a portion of another embodiment compressor wheel component.

In the embodiment shown in FIG. 4, during operation of the engine, the wheels can expand outwardly along axis X, which provides additional tension in connecting element 240, and increases the clamping force securing wheels 210, 212, 220, 222, 230 to one another when most needed during engine operation.

It should be appreciated that various abutment configurations between the rims of the adjacent compressor wheels are contemplated, including threaded connections, splines and curvic couplings. In addition, the various abutment configurations can provide at least a partial seal between abutting structures, can stabilize abutting structures relative to one another, can provide some coupling of abutting structures, for example, due to friction or other forces between abutting structures, and can also provide force transfer between abutting structures. Nevertheless, it should be understood that even in embodiments which include each of the foregoing features, the compression force supplied by connecting element 240 allows an interconnection of components to be used that allows each stage of the compressor or other engine component to be readily and non-destructively disassembled and assembled for maintenance, inspection and repair, reducing life cycle costs.

While FIG. 2 illustrates one interconnection of compressor wheels 210, 212, 220, 222, 230 and connecting element 240, a variety of other interconnections are contemplated. For example, greater or fewer numbers of compressor wheels could be used. Furthermore, greater numbers of shafts or other structures intermediate of the compressor wheels could be used. A variety of additional interconnections including interconnection of various components, structures, elements, and features noted above, and others are also contemplated.

Various aspects of the features disclosed herein are contemplated. According to one aspect, an apparatus comprises a first rotational gas turbine engine component that includes an elongated connecting element fixed thereto that extends from the first rotational component substantially on an axis of rotation of the apparatus. The apparatus also includes a second rotational gas turbine engine component that includes a bore extending therethrough along the axis of rotation. A mounting structure is engaged to the second rotational component on a side opposite the first rotational component. The connecting element extends through the bore of the second rotational component and is connected to the mounting structure to compress the second rotational component between the mounting structure and the first rotational component.

In one embodiment of the apparatus, the first rotational gas turbine engine component is a first compressor wheel and the second rotational gas turbine engine component is a second compressor wheel. In another embodiment, the connecting element is an elongated rod having a hollow interior for receiving a shaft. The elongated rod extends from a first end that is fixedly connected to the first compressor wheel to an opposite second end removably connected to the mounting structure.

In another embodiment, the apparatus further comprises a third compressor wheel located on a side of the first compressor wheel opposite the second compressor wheel. The third compressor wheel includes a bore that extends therethrough along the axis of rotation. The connecting element includes a first elongate portion extending from the first compressor wheel through the bore of the second compressor wheel for connection with the mounting structure. The connecting element further includes a second elongate portion extending from the first compressor wheel through the bore of the third compressor wheel that is connected to a second mounting structure. The second mounting structure is positioned on a side of the third compressor wheel opposite the first compressor wheel. Tensioning the second elongate portion of the connecting element compresses the third compressor wheel between the second mounting structure and the first compressor wheel. In one refinement of this embodiment, the first elongate portion of the connecting element is made from a first material and the second elongate portion of the connecting element is made from a second material that is different from the first material. In yet another refinement, the first compressor wheel is made from one of the first material and the second material. In another refinement, the first compressor wheel is made from a third material that is different from the first material and the second material.

In yet another refinement of this embodiment, a fourth compressor wheel is located between the mounting structure and the second compressor wheel. The fourth compressor wheel includes a bore extending therethrough along the axis of rotation with the first elongate portion of the connecting element extending through the bore to compress the second and fourth compressor wheels between the mounting structure and the first compressor wheel. A fifth compressor wheel is located between the mounting structure and the third compressor wheel. The fifth compressor wheel includes a bore extending therethrough along the axis of rotation with the second elongate portion of the connecting element extending through the bore to compress the third and fifth compressor wheels between the second mounting structure and the first compressor wheel.

In another embodiment, the mounting structure is at least one of a strut and an outer compressor wheel. In yet another embodiment, the connecting element is a unitary structure with the first rotational component. In another embodiment, the connecting element is fixedly connected to the first rotational component. In yet another embodiment, the bore of the second rotational component defines an air flow passage around the connecting element.

According to another aspect, a system comprises a first gas turbine engine compressor wheel that includes an elongate connecting element fixed thereto. The connecting element extends from the first compressor wheel substantially on a rotational axis of the compressor wheel. The system further comprises a second gas turbine engine compressor wheel adjacent the first compressor wheel. The second compressor wheel includes a bore and the connecting element extends through the bore. The system also includes a mounting structure on a side of the second compressor wheel opposite the first compressor wheel. The connecting element is connected to the mounting structure in tension to compress the second compressor wheel between the mounting structure and the first compressor wheel.

According to one embodiment of the system, the bore of the second compressor wheel defines an air passage around the connecting element. According to another embodiment, a rim of the second compressor wheel is compressed against a rim of the first compressor wheel, and the rims engage one another to transmit torque between the first and second compressor wheels during rotation of the first and second compressor wheels. In another embodiment, the connecting element is an elongated rod having a hollow interior for receiving a shaft. The connecting element extends between a first end fixedly connected to the first compressor wheel and an opposite second end removably connected to the mounting structure.

In another embodiment of the system, a third compressor wheel is located on a side of the first compressor wheel opposite the second compressor wheel. The third compressor wheel includes a bore extending therethrough on the axis of rotation. The connecting element includes a first elongate portion extending from the first compressor wheel through the bore of the second compressor wheel for connection with the mounting structure. The connecting element further includes a second elongate portion extending from the first compressor wheel through the bore of the third compressor wheel that is connected to a second mounting structure. The second mounting structure is positioned on a side of third compressor wheel opposite the first compressor wheel and tension from the second elongate portion of the connecting element compresses the third compressor wheel between the second mounting structure and the first compressor wheel. In one refinement of this embodiment, the first elongate portion of the connecting element is made from a first material and the second elongate portion of the connecting element is made from a second material that is different from the first material. In another refinement of this embodiment, the tension in the first elongate portion of the connecting element substantially differs from the tension in the second elongate portion.

According to another aspect, a method comprises positioning a first compressor wheel around a first connecting element portion fixedly connected to and extending axially from a mounting compressor wheel; fastening the first connecting element portion to a first mounting structure located on a side of the first compressor wheel that is opposite the mounting compressor wheel; tensioning the first connecting element portion to compress a rim of the first compressor wheel between the first mounting structure and the mounting compressor wheel; positioning a second compressor wheel around a second connecting element portion fixedly connected to and extending axially from the mounting compressor wheel in a direction opposite the first connecting element portion; fastening the second connecting element portion to a second mounting structure located on a side of the second compressor wheel that is opposite the mounting compressor wheel; and tensioning the second connecting element portion to compress a rim of the second compressor wheel between the mounting structure and the mounting compressor wheel.

In one embodiment, the method includes positioning a third compressor wheel around the first connecting element portion and tensioning the first connecting element portion to compress rims of the first and third compressor wheels between the first mounting structure and the mounting compressor wheel. In a further refinement of this embodiment, the method includes positioning a fourth compressor wheel around the second connecting element portion and tensioning the second connecting element portion to compress rims of the second and fourth compressor wheels between the second mounting structure and the mounting compressor wheel.

In another embodiment, the first compressor wheel, the second compressor wheel, and the mounting compressor wheel are components of a complete gas turbine engine. The method further comprises starting the gas turbine engine; operating the gas turbine engine during transient maneuvers with wide temperature variations; and stopping the gas turbine engine.

In another embodiment of the method, positioning the first compressor wheel around the first connecting element portion forms a first flow passage around the connecting element between the connecting element and the first compressor wheel. Positioning the second compressor wheel around the second connecting element portion forms a second flow passage around the connecting element between the connecting element and the second compressor wheel. The method further comprises isolating the first flow passage from the second flow passage with the mounting compressor wheel positioned therebetween.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a first rotational component including an exterior circumferential surface and an elongated connecting element fixed thereto having a first end and a second end and extending therefrom substantially on an axis of rotation of the apparatus;
a second rotational component including an exterior circumferential surface and a bore extending therethrough along the axis of rotation;
a third rotational component including an exterior circumferential surface and a bore extending therethrough along the axis of rotation;
a first fastener including a nut threaded around the first end of the elongated connecting element;
a second fastener including a nut threaded around the second end of the elongated connecting element;
a first mounting structure abuttingly engaged to the first fastener and engaged to the exterior circumferential surface of the second rotational component on a side of the second rotational component opposite the first rotational component;
a second mounting structure abuttingly engaged to the second fastener and engaged to the exterior circumferential surface of the third rotational component on a side of the third rotational component opposite the second rotational component;
the elongated connecting element includes a first elongated portion that extends through the bore of the second rotational component and is connected to the first mounting structure so as to compress the second rotational component between the first mounting structure and the first rotational component based on a first tension force applied to the first portion by the first fastener to interconnect the second rotational component and the first rotational component; and
the elongated connecting element includes a second elongated portion that extends through the bore of the third rotational component and is connected to the second mounting structure so as to compress the third rotational component between the second mounting structure and the first rotational component based on a second tension force applied to the second portion by the second fastener and being different from the first tension force of the first fastener to interconnect the third rotational component and the first rotational component; and
wherein the first rotational component is a first compressor wheel, the second rotational component is a second compressor wheel, and the third rotational component is a third compressor wheel.

2. The apparatus of claim 1, wherein the first, second, and third rotational components are gas turbine engine components.

3. The apparatus of claim 1 wherein the elongated connecting element is an elongated rod having a hollow interior for receiving a shaft, the elongated rod extending from a first end fixedly connected to the first compressor wheel to an opposite second end removably connected to the first mounting structure.

4. The apparatus of claim 3 wherein the first elongate portion of the elongated connecting element is made from a first material and the second elongate portion of the elongated connecting element is made from a second material that is different from the first material.

5. The apparatus of claim 4 wherein the first compressor wheel is made from one of the first material and the second material.

6. The apparatus of claim 4 wherein the first compressor wheel is made from a third material that is different from the first material and the second material.

7. The apparatus of claim 3 further comprising:
a fourth compressor wheel located between the first mounting structure and the second compressor wheel, the fourth compressor wheel including a bore extending therethrough along the axis of rotation with the first elongate portion of the elongated connecting element extending therethrough to compress the second and fourth compressor wheels between the first mounting structure and the first compressor wheel; and
a fifth compressor wheel located between the second mounting structure and the third compressor wheel, the fifth compressor wheel including a bore extending therethrough along the axis of rotation with the second elongate portion of the elongated connecting element extending therethrough to compress the third and fifth compressor wheels between the second mounting structure and the first compressor wheel.

8. The apparatus of claim 1 wherein the first mounting structure is at least one of a strut and an outer compressor wheel.

9. The apparatus of claim 1 wherein the elongated connecting element is a unitary structure with the first rotational component.

10. The apparatus of claim 1 wherein the bore of the second rotational component defines an air passage around the elongated connecting element.

11. A system comprising:
a first compressor wheel including an exterior circumferential surface and an elongate connecting element fixed thereto having a first end and a second end, the elongate connecting element from the first compressor wheel substantially on a rotational axis of the compressor wheel;
a second compressor wheel adjacent the first compressor wheel on a first axial side thereof, the second compressor wheel including an exterior circumferential surface and a bore wherein the elongate connecting element extends through the bore;
a third compressor wheel adjacent the first compressor wheel on a second axial side thereof, the third compressor wheel including an exterior circumferential surface and a bore extending therethrough along the axis of rotation;
a first fastener including a nut threaded around the first end of the elongate connecting element;
a second fastener including a nut threaded around the second end of the elongate connecting element;
a first mounting structure abuttingly engaged to the first fastener and engaged to the exterior circumferential surface of the second compressor wheel opposite the first compressor wheel;
a second mounting structure abuttingly engaged to the second fastener and engaged to the exterior circumferential surface of the third compressor wheel opposite the second compressor wheel;
the elongate connecting element includes a first elongated portion connected to the first mounting structure so as to compress the second compressor wheel between the first mounting structure and the first compressor wheel wherein the compression of the second compressor wheel and first compressor wheel is of sufficient strength to rotatably interconnect the second compressor wheel and first compressor wheel; and
the elongate connecting element includes a second elongated portion connected to the second mounting structure so as to compress the third compressor wheel between the second mounting structure and the first compressor wheel wherein the compression of the third compressor wheel and first compressor wheel is of sufficient strength to rotatably interconnect the third compressor wheel and the first compressor wheel.

12. The system of claim 11, wherein the first, second, and third compressor wheels are gas turbine engine compressor wheels.

13. The system of claim 11 wherein the bore of the second compressor wheel defines an air passage around the elongate connecting element.

14. The system of claim 11 wherein the exterior circumferential surface of the second compressor wheel includes a rim and the exterior circumferential surface of the first compressor wheel include a rim, wherein the rim of the second compressor wheel is compressed against the rim of the first compressor wheel, and the rims engage one another to transmit torque between the first and second compressor wheels during rotation of the first and second compressor wheels.

15. The system of claim 11 wherein the elongate connecting element is an elongated rod having a hollow interior for receiving a shaft, the elongate connecting element extending between a first end fixedly connected to the first compressor wheel and an opposite second end removably connected to the first mounting structure.

16. The system of claim 15 wherein the first elongate portion of the elongate connecting element is made from a first material and the second elongate portion of the elongate connecting element is made from a second material that is different from the first material.

17. The system of claim 15 wherein the tension in the first elongate portion of the elongate connecting element substantially differs from the tension in the second elongate portion.

18. The system of claim 11 wherein the first mounting structure is selected from the group consisting of at least one strut and an outermost compressor wheel.

19. A method comprising:
positioning a first compressor wheel around a first elongated connecting element portion fixedly connected to and extending axially from a mounting compressor wheel;
fastening the first connecting element portion to a first mounting structure located at the exterior circumferential surface of the first compressor wheel that is opposite the mounting compressor wheel;
compressing the first connecting element portion to a first relative extent so as to compress the exterior circumferential surface of the first compressor wheel between the abuttingly engaged first mounting structure and the exterior circumferential surface of the mounting compressor wheel wherein compressing the exterior circumferential surface of the first compressor wheel and the mounting compressor wheel is of sufficient strength to rotatably interconnect the first compressor wheel and mounting compressor wheel;

positioning a second compressor wheel around a second elongated connecting element portion fixedly connected to and extending axially away from the mounting compressor wheel in a direction opposite the first connecting element portion;

fastening the second connecting element portion to a second mounting structure located at the exterior circumferential surface of the second compressor wheel that is opposite the mounting compressor wheel; and compressing the second connecting element portion to a second relative extent so as to compress the exterior circumferential surface of the second compressor wheel between the abuttingly engaged second mounting structure and the exterior circumferential surface of the mounting compressor wheel wherein compressing the exterior circumferential surface of the second compressor wheel and the mounting compressor wheel is of sufficient strength to rotatably interconnect the second compressor wheel and mounting compressor wheel.

20. The method of claim 19 further comprising:
positioning a third compressor wheel around the first connecting element portion; and compressing the first connecting element portion so as to compress the exterior circumferential surface of the first and third compressor wheels between the abuttingly engaged first mounting structure and the exterior circumferential surface of the mounting compressor wheel.

21. The method of claim 20 further comprising:
positioning a fourth compressor wheel around the second connecting element portion; and compressing the second connecting element portion so as to compress the exterior circumferential surface of the second and fourth compressor wheels between the abuttingly engaged second mounting structure and the exterior circumferential surface of the mounting compressor wheel.

22. The method of claim 19 wherein the first compressor wheel, the second compressor wheel, and the mounting compressor wheel are components of a complete gas turbine engine and further comprising:
starting the gas turbine engine;
operating the gas turbine engine during transient maneuvers with wide temperature variations; and
stopping the gas turbine engine.

23. The method of claim 19, wherein:
positioning the first compressor wheel around the first elongated connecting element portion forms a first flow passage around the elongate connecting element between the elongate connecting element and the first compressor wheel;
positioning the second compressor wheel around the second elongated connecting element portion forms a second flow passage around the elongate connecting element between the elongate connecting element and the second compressor wheel; and
further comprising isolating the first flow passage from the second flow passage with the mounting compressor wheel positioned therebetween.

\* \* \* \* \*